(12) United States Patent  (10) Patent No.: US 7,643,703 B2
Jones et al.  (45) Date of Patent: Jan. 5, 2010

(54) IMAGE CHANGE DETECTION SYSTEMS, METHODS, AND ARTICLES OF MANUFACTURE

(75) Inventors: James L. Jones, Idaho Falls, ID (US); Gordon D. Lassahn, Idaho Falls, ID (US); Gregory D. Lancaster, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 97 days.

(21) Appl. No.: 10/655,467

(22) Filed: Sep. 3, 2003

(65) Prior Publication Data

US 2005/0047678 A1  Mar. 3, 2005

(51) Int. Cl.
*G06K 9/36* (2006.01)

(52) U.S. Cl. .................................... 382/294
(58) Field of Classification Search ................ 382/266, 382/284, 294; 348/588
See application file for complete search history.

(56) References Cited

U.S. PATENT DOCUMENTS

| | | | | |
|---|---|---|---|---|
| 5,729,360 | A * | 3/1998 | Kita et al. .................... | 358/500 |
| 5,987,161 | A * | 11/1999 | Doane et al. ................. | 382/149 |
| 6,011,558 | A * | 1/2000 | Hsieh et al. .................. | 345/629 |
| 6,075,905 | A * | 6/2000 | Herman et al. ............... | 382/284 |
| 6,181,838 | B1 * | 1/2001 | Knowlton .................... | 382/305 |
| 6,266,453 | B1 * | 7/2001 | Hibbard et al. .............. | 382/294 |
| 6,434,264 | B1 * | 8/2002 | Asar ............................ | 382/147 |
| 6,912,293 | B1 * | 6/2005 | Korobkin ..................... | 382/100 |
| 6,922,485 | B2 * | 7/2005 | Hirata .......................... | 382/164 |
| 2002/0057838 | A1 * | 5/2002 | Steger .......................... | 382/197 |
| 2002/0176638 | A1 * | 11/2002 | Stone et al. .................. | 382/294 |
| 2004/0264760 | A1 * | 12/2004 | Ishikawa ..................... | 382/145 |

OTHER PUBLICATIONS

"A Survey of Image Registration Techniques" Brown, Lisa Gottesfeld. Department of Computer Science, Columbia University, New York, NY, 1992.
"Automatic Visual/IR Image Registration" Li, Henry Hui. Yi-Tong Zhou, HNC Software, Inc. San Diego, CA, 1996.
Anomaly Detection Through Registration, Chen et al. School of Computer Science, Carnegie Mellon University Pittsburgh, PA. May 25, 1998.
"A Survey or New Techniques for Image Registration and Mapping" Kashet, Bayesteh G, The Aerospace Corporation, El Seguado, CA, and Sawemak, Alexander A. University of Southern California, Los Angeles, CA.

* cited by examiner

*Primary Examiner*—Andrew W Johns
(74) *Attorney, Agent, or Firm*—TraskBritt

(57) ABSTRACT

Aspects of the invention relate to image change detection systems, methods, and articles of manufacture. According to one aspect, a method of identifying differences between a plurality of images is described. The method includes loading a source image and a target image into memory of a computer, constructing source and target edge images from the source and target images to enable processing of multiband images, displaying the source and target images on a display device of the computer, aligning the source and target edge images, switching displaying of the source image and the target image on the display device, to enable identification of differences between the source image and the target image.

32 Claims, 10 Drawing Sheets

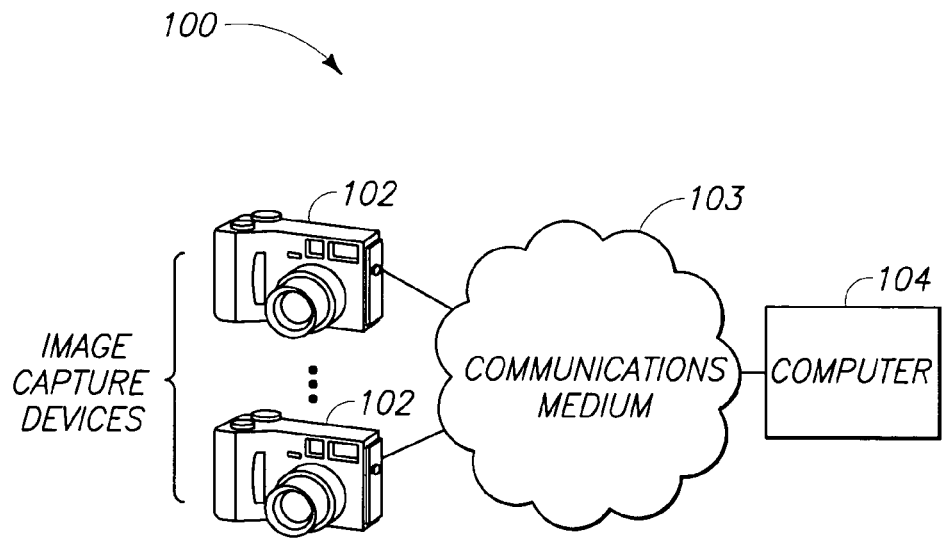
F I G 1
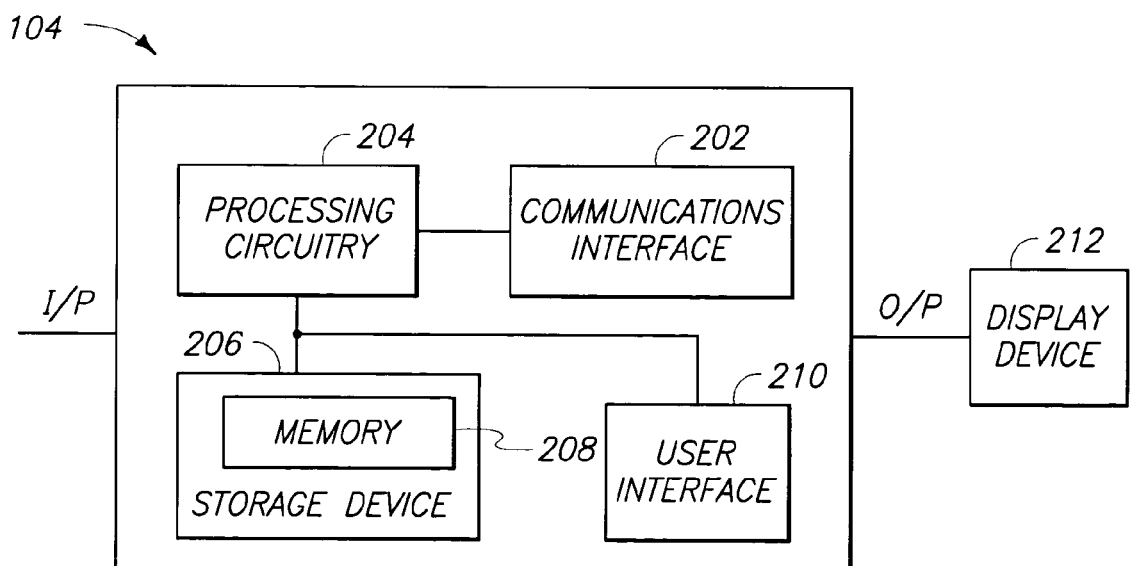
F I G 2

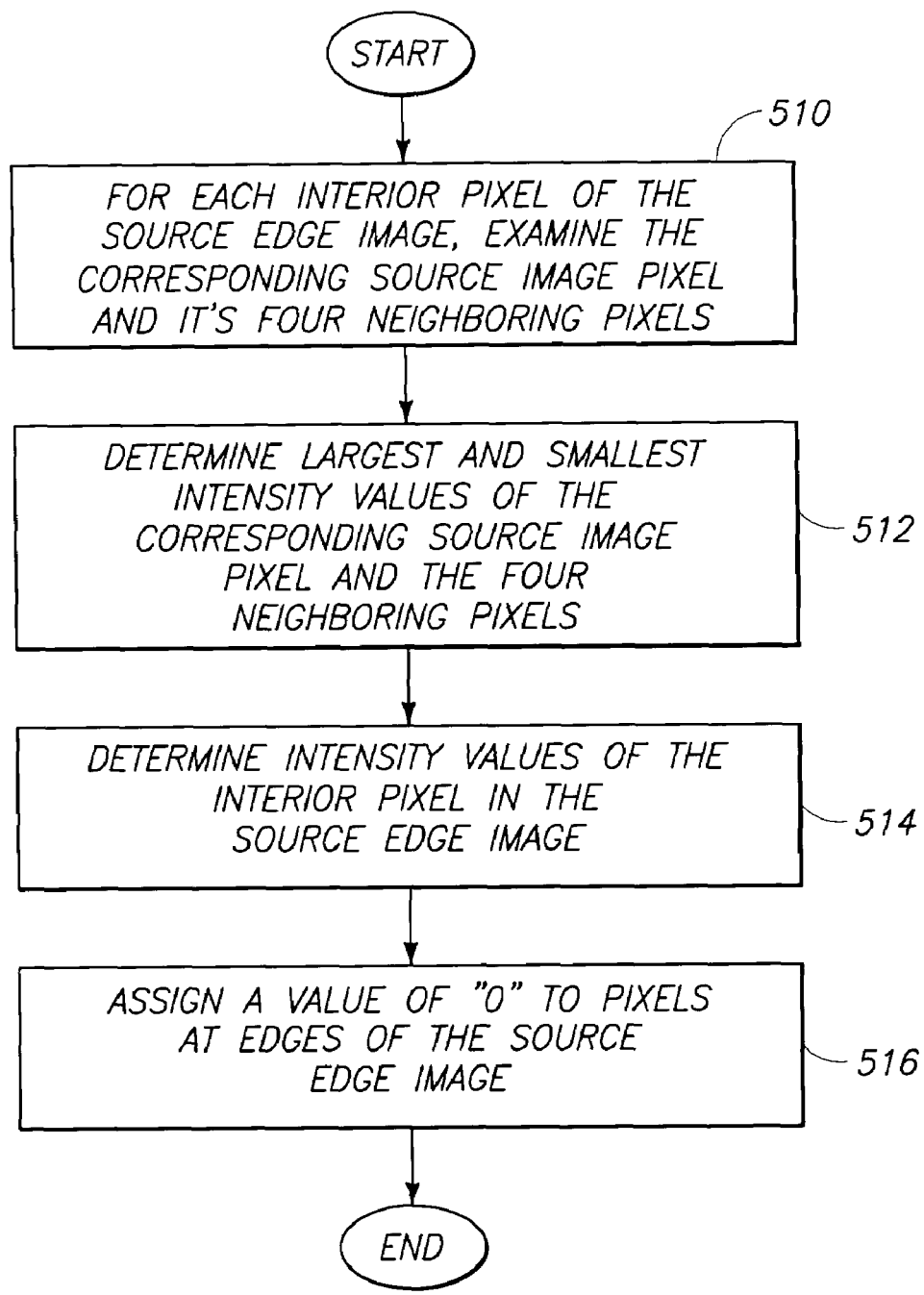

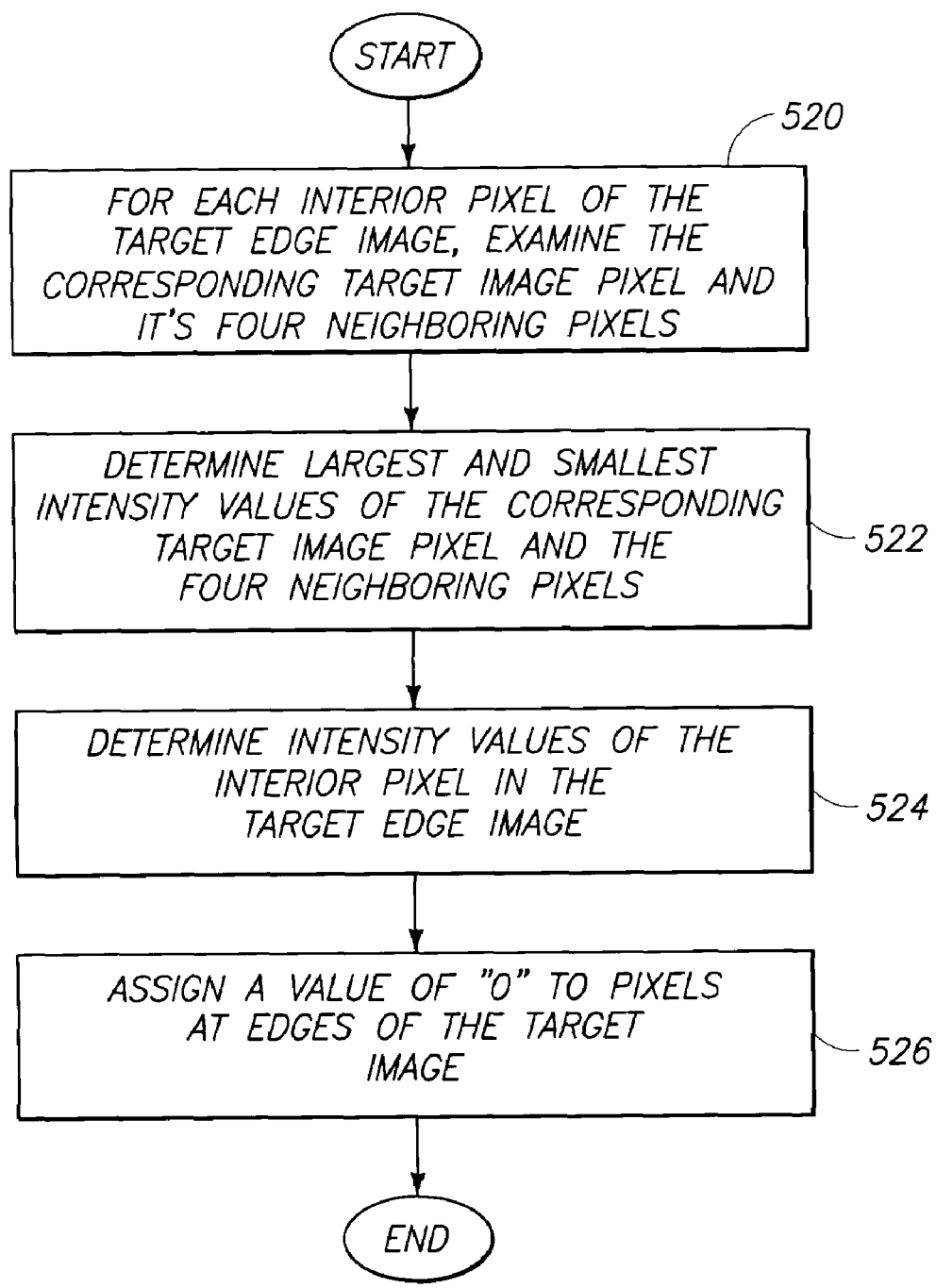

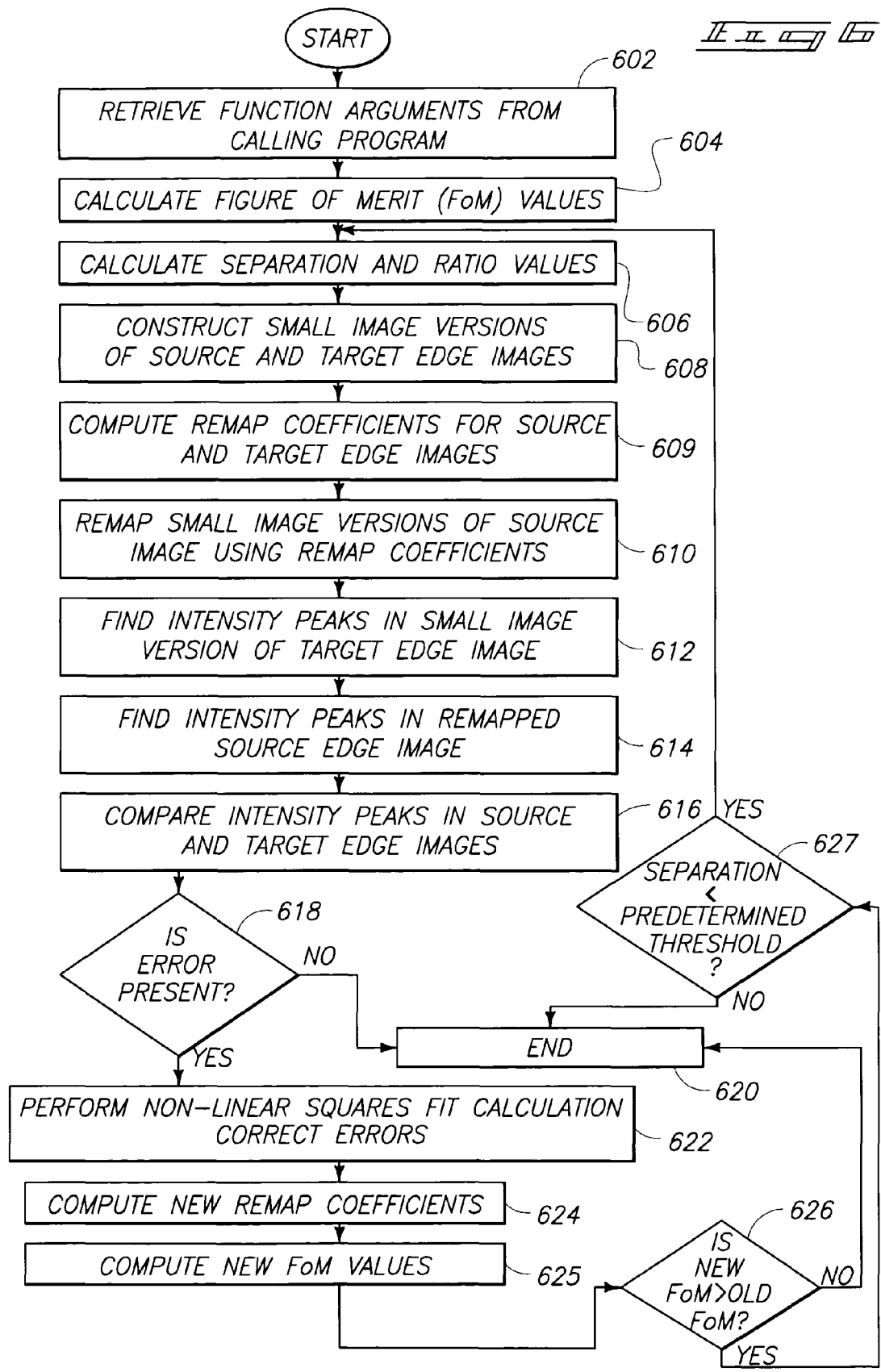

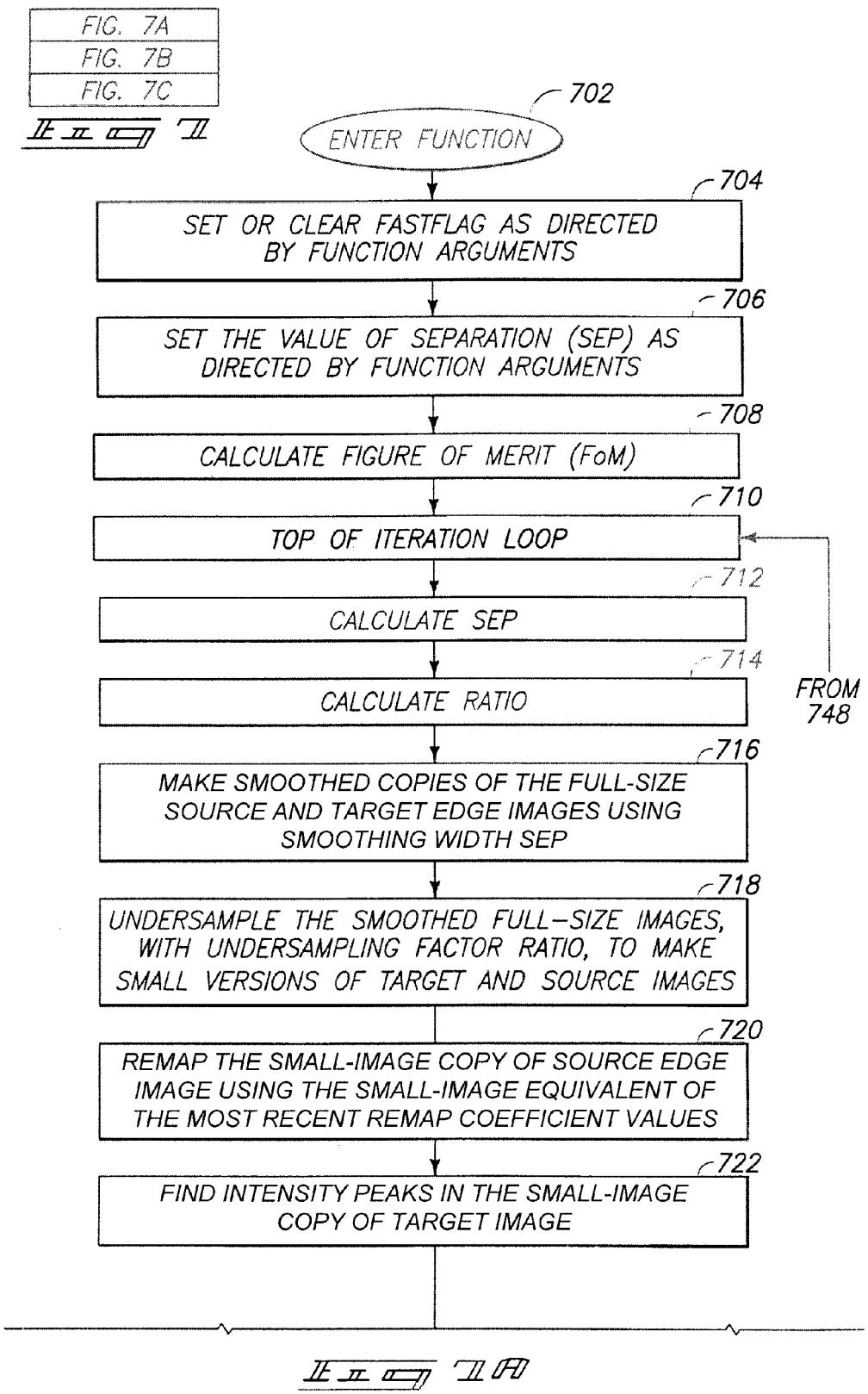

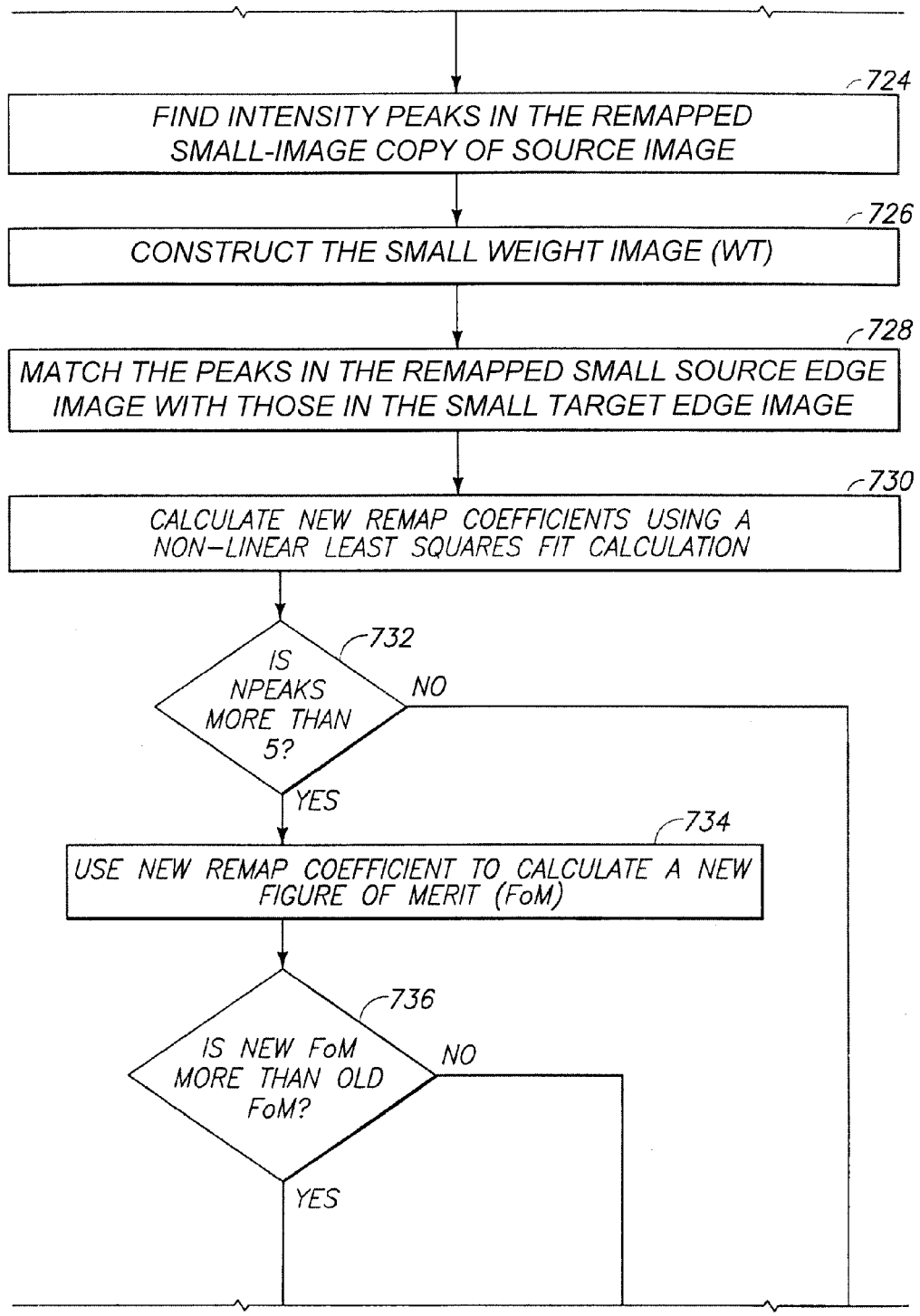

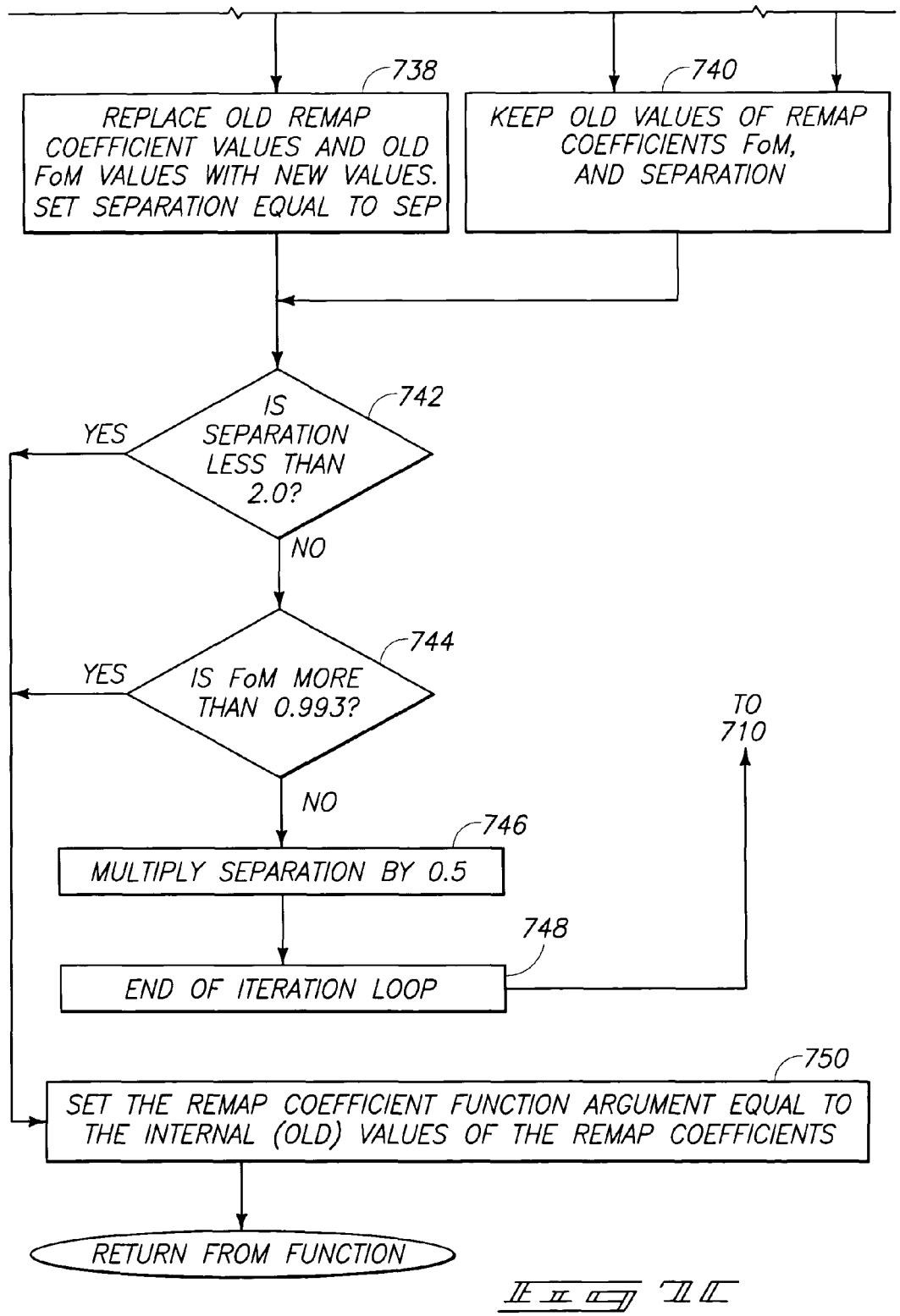

IMAGE CHANGE DETECTION SYSTEMS, METHODS, AND ARTICLES OF MANUFACTURE

GOVERNMENT RIGHTS

This invention was made with government support under Contract Nos. DE-AC07-05ID14517 and DE-AC07-99ID 13727 awarded by the United States Department of Energy. The government has certain rights in the invention.

TECHNICAL FIELD

Aspects of the invention relate to image change detection systems, methods, and articles of manufacture.

BACKGROUND OF THE INVENTION

Change detection schemes are known in the art for applications such as security applications. A change occurring in a video image can mean that an intruder is entering, for example. By only monitoring changes in images, storage requirements can be reduced, particularly if digital images are being recorded. There is no point using storage to save multiple copies of background visual information that does not change. Change detection is also useful in medical and other applications.

Change detection techniques typically rely on clustering schemes that identify the coordinates of pixels that have changed between different time intervals. Change detection metrics generally operate by detecting numerical differences in corresponding pixel values between the different time intervals.

Photographs taken over time capture changes of the captured objects. The changes may be obvious to an observing viewer or they may be inconspicuous even to a keen observer. If the changes are subtle, such as for example, blood vessel damage during eye surgery, such changes may not readily show up in a side-by-side comparison of two photographs taken at different instances in time.

Accordingly, a system and method are required to expose inconspicuous differences from a plurality of photographs that are taken at different instances in time.

SUMMARY OF THE INVENTION

Aspects of the invention relate to image change detection systems, methods, and articles of manufacture.

According to one aspect, a method of identifying differences between a pair of images is described. The method includes loading a source image and a target image into memory of a computer, constructing source and target edge images from the source and target images to enable processing of multiband images, displaying the source and target images on a display device of the computer, aligning the source and target images, switching displaying of the source image and the target image on the display device to enable identification of differences between the source image and the target image.

According to another aspect, a method of identifying differences between a pair of images is described. The method includes receiving source and target images in a computer, constructing source and target edge images from the respective source and target images to enable processing of multiband images, performing alignment of the source and target images displayed on a display device of the computer, and periodically switching displaying of the source and target images on the display device.

According to a further aspect, an image change detection system is described. The system includes a storage device configured to receive and store a pair of images, the pair of images including a source image and a target image. The system also includes processing circuitry configured to receive the source and target images, compute source and target edge images from the respective source and target images to enable processing of multiband images, execute alignment of the source and target edge images, and execute periodic switching of the source and target images to enable a user to determine changes between the source and target images.

According to yet another aspect, an article of manufacture is described. The article of manufacture includes a processor-usable media embodying programming configured to cause a processing circuitry of an image change detection system to load a source image and a target image into memory of a computer, construct source and target edge images from the source and target images to enable processing of multiband images, display the source and target images on a display device of the computer, align the source and target edge images, and switch displaying of the source image and the target image on the display device in order to enable identification of differences between the source image and the target image.

According to a yet further aspect, an image change detection system is provided. The image change detection system includes means for loading a source image and a target image into memory of a computer means, means for constructing source and target edge images from the source and target images to enable processing of multiband images, means for displaying the source and target images on a display means of the computer means, means for aligning the source and target edge images, and means for switching displaying of the source image and the target image on the display means to enable identification of differences between the source image and the target image.

Other aspects of the invention are disclosed herein as is apparent from the following description and figures.

BRIEF DESCRIPTION OF THE DRAWINGS

FIG. 1 is a schematic of an image change detection system having a computer device in accordance with some embodiments of the present invention.

FIG. 2 is a functional block diagram of a computer device to determine changes in a plurality of images according to some embodiments of the present invention.

FIG. 5A is an exemplary flowchart illustrating a methodology for constructing a source edge image from a source image in accordance with an exemplary embodiment of the present invention.

FIG. 5B is an exemplary flow chart illustrating a methodology for constructing a target edge image from a target image in accordance with an exemplary embodiment of the present invention.

FIG. 6 is a high-level flow chart illustrating a methodology to perform alignment of a source image and a target image during the process of determining differences between the source and target images in accordance with some embodiments of the present invention.

FIG. 7 is a detailed flow chart, which is further broken down into FIGS. 7A-7C, of the methodology shown in the flow chart of FIG. 6.

DETAILED DESCRIPTION OF THE PREFERRED EMBODIMENTS

Figure 3:
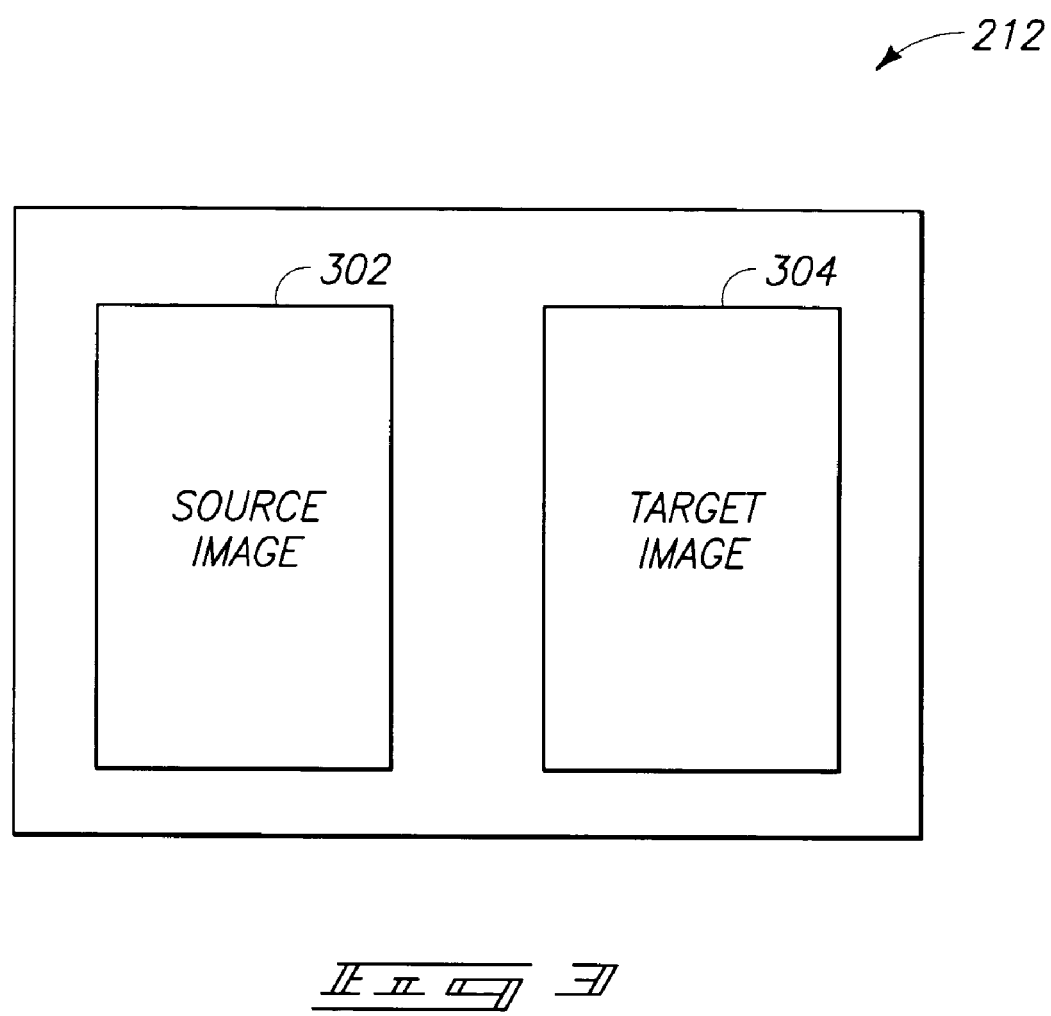
FIG. 3 is a schematic illustrating displaying of a source image and a target image on a display device of the computer device shown in FIG. 2.

Referring to FIG. 1, an exemplary image change detection system 100 arranged according to an exemplary embodiment is shown. The depicted image change detection system 100 includes one or more image capture devices 102, a communications medium 103, and a computer 104. In one arrangement, at least some or all of devices 102 and 104 are provided at locations physically separated from one another.

Individual ones of image capture devices 102 may be configured to capture and transmit digital images to computer 104 via communications medium 103. The communications medium 103 may be a wired or wireless communications medium. Other ways of providing digital images to computer 104 are possible. For example, images may be stored in storage media, such as computer disks, optical disks, etc., and then used by the computer 104 to retrieve digital images stored in the storage media.

Communications medium 103 may be configured to implement communications between image capture devices 102 and computer 104. Communications medium 103 may be configured in any suitable manner to provide communication of electronic data, programming or other information between communicatively coupled devices. For example, communications medium 103 may comprise private and/or public networks and networking components, (e.g., Internet, an intranet, or any communications network using a TCP/IP protocol, and hardware such as network cards or other equipment, modems, and/or routers, etc.).

Referring to FIG. 2, further details of a computer 104 are shown in accordance with some embodiments. Computer 104 is configured to receive digital images (e.g., from image capture devices 102 or directly at computer 104 via storage media), and process the digital images to determine changes in the digital images (e.g., between a source image and a target image). Computer 104 includes a communications interface 202, processing circuitry 204, a storage device 206 having a memory 208, a user interface 210, and display device 212.

Communications interface 202 is configured to communicate electronic data externally of the computer 104. For example, communications interface 202 enables communication with respect to communications medium 103. In one embodiment, communications interface 202 is arranged to provide input/output communications with respect to external devices (e.g., image capture devices 102). Communications interface 202 may comprise a parallel port, USB port, EIO slot, network interface card, IEEE 1394 connector, and/or other appropriate configuration capable of communicating electronic data.

Processing circuitry 204 is configured to process data (e.g., digital images) received as an input. As noted above, digital images may be captured by image capture devices 102 and provided to computer 104 via communications medium 103. Alternatively, digital images may be provided to computer 104 via storage media that may be inserted in a device (e.g., disc drive, optical drive, CD-ROM, etc.) of the computer 104 or coupled to the computer 104.

The processing circuitry 204 may comprise circuitry configured to execute programming. In an exemplary embodiment, the processing circuitry 204 may be implemented as a microprocessor or other structure configured to execute executable applications of programming including, for example, software and/or firmware instructions. Other exemplary embodiments of processing circuitry 204 include hardware logic, PGA, FPGA, ASIC, and/or other structures. These examples of processing circuitry 204 are for illustration and other configurations are possible for implementing operations discussed herein.

In one example, processing circuitry 204 may be configured to include instructions or executable applications stored in storage device 206 responsive to a user request. Exemplary commands or executable applications received by computer 104 can include, for example, a user request to perform automatic registration of images, automatically executing a blinker display of a plurality of images (e.g., source and target images 302, 304) in order to enable a user to identify changes in the plurality of images, etc. The term "blinker display" used herein refers to periodically switching a display of images (e.g., alternating display of first and second images). Such periodic switching may be programmed into computer 104 or manually performed by the user.

The storage device 206 may be configured to store a plurality of images in digital form for comparison purposes. The storage device 206 may be configured to store electronic data (e.g., electronic or digital image data), file systems having one or more electronic files (e.g., image files), programming such as executable instructions (e.g., software and/or firmware), and/or other digital information and may include processor-usable media. Digital or electronic images or image files may be loaded into memory 208 after receiving a user request to determine changes or differences among a plurality of images (e.g., between a source image and a target image). The plurality of digital images may be loaded into memory 208 of the storage device 206 during execution of the blinker display of the plurality of digital images, as described above.

Processor-usable media includes any article of manufacture which can contain, store, or maintain programming, data and/or digital information for use by or in connection with an instruction execution system including processing circuitry 204 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, Flash memory, cache memory, and/or other configurations capable of storing programming, data, or other digital information.

User interface 210 may be configured to provide input data to computer 104. Exemplary user interfaces may include keyboard, mouse, or other devices to input data into the computer 104.

Display device 212 is configured to display information processed by computer 104 or information received by computer 104 for processing. For example, a plurality of digital images (e.g., source and target images, 302, 304) may be displayed on the display device 212 in order to identify differences in the images by a user of the computer 104.

FIG. 3 is an exemplary schematic illustrating displaying of source and target images on a display device 212 of computer 104 (FIG. 2) in accordance with some embodiments of the present invention. Source and target images 302, 304, respectively, may be displayed on display device 212 by a user of computer 104 in order to provide an indication of whether the source and target images 302, 304 are registered or not with respect to each other. The source and target images 302, 304 may be received and stored as digital files in computer 104. Source and target image files are retrieved from memory 208 of computer 104 and displayed as source and target images 302, 304, respectively.

In some embodiments, the source and target images 302, 304, respectively, may be configured to be displayed adjacent each other (e.g., side-by-side) prior to execution of the blinker display (e.g., periodically switching displaying of the source and target images) in order to determine that the source and target images 302, 304 are registered with respect to each other. The source and target images 302, 304, respectively, may be displayed adjacent each other in order to enable a user to ensure alignment of the source and target images 302, 304. Registration of the source and target images 302, 304 is performed in order to ensure alignment and correction of misalignment errors by computing source and target edge images from corresponding source and target images 302, 304. Alignment of the source and target images 302, 304 is performed by computing corresponding source and target edge images and performing registration using the source and target edge images.

In order for the blinker display to be effective, the source and target images 302, 304 are preferably aligned so that objects or features present in the source image 302 occupy substantially similar locations in the target image 304 as well. If the source and target images 302, 304 are captured using different camera positions, there may be enough misalignment between such source and target images in order to render the blinker display ineffective. Depending on the magnitude of misalignment, it may be possible to partially or totally correct the misalignment by performing an image registration process. In the image registration process, one of the source or target images 302, 304 may be moved horizontally or vertically, rotated, magnified, stretched by differing amounts in different parts of the image, or otherwise remapped, in order to align (e.g., line-up) corresponding objects or features in the source and target images 302, 304. In some embodiments, this registration process may be sufficient to align the source and target images 302, 304 in order to render the blinker display sufficiently useful.

Alignment of the source and target edge images may be performed automatically by the processing circuitry 204 of the computer 104, or manually by a user of the computer 104. Further details regarding computing source and target edge images are described with regard to FIG. 5, and further details regarding performing automatic alignment of the source and target edge images is set forth with regard to FIG. 6. However, if manual alignment of the source and target edge images is desired, the following procedure may be implemented:

With the source and target images 302, 304 displayed adjacent each other on the display device 212 of the computer 104 (FIG. 2), a user of the computer 104 may mark or select corresponding points (e.g., tie-points) or objects in the source and target images 302, 304. The user may specify to the processing circuitry 204 that a certain point in the source image 302 is desired to be aligned with some other point in the target image 304. In this manner, the user may select any number of pairs of points from the source and target images 302, 304. The selection or marking of the points in the source and target images 302, 304 may be performed by using a user-interface (e.g., mouse) to select a region (e.g., draw a rectangle) around a brightness-contrasted object in each of the source and target images 302, 304. The user may also select the points in the source and target images 302, 304 by selecting (e.g., clicking) on some color-contrasted object in each of the source and target images. After selection of some control points (tie-points), they may be used to align the source and target images 302, 304 so that execution of the blinker display, in order to determine differences between the source and target image 302, 304, may be sufficiently useful. The user-selected tie-points may also be used as a starting point if the user chooses an automatic registration and alignment option. Approximate alignment from user-selected tie-points or control points makes the registration process more reliable, and the likelihood of producing more positive results with reduced errors.

Furthermore, the user may also select a part of an image pair (e.g., source and target images 302, 304) to be used in the blinker display and for image registration calculations. Selection of a part of an image pair allows a magnified view of the selected region, thereby enabling the image registration calculation to better align the selected region without being too sensitive to misaligned objects lying outside of the selected region in the source and target images 302, 304.

The source and target images 302, 304 (FIG. 3) may be displayed in other forms (e.g., overlapping one another) instead of displaying them adjacent each other as noted above. Upon ensuring alignment with respect to each other, the source and target images 302, 304 may be respectively configured (e.g., remapped) such that each of the source and target images 302, 304, respectively, completely fill a display area of the display device 212. In such a case, only one image (e.g., source image 302 or target image 304) may be displayed on the display device 212. After ensuring alignment and remapping of the source and target images 302, 304, the blinker display of the source and target images 302, 304 may be executed to determine differences therein. The blinker display may be executed either automatically by processing circuitry 204 of computer 104 or manually by a user of the computer 104. The blinker display of the source and target images 302, 304 may be executed by programming the processing circuitry 204 (FIG. 2) to automatically execute such blinker display. For example, timing to switch between the source and target images 302, 304, respectively, may be programmed into the processing circuitry 204. However, if manual execution of the blinker display is desired, a user of computer 104 may execute the switching between the source and target images 302, 304 displayed on the display device 212.

Figure 4:
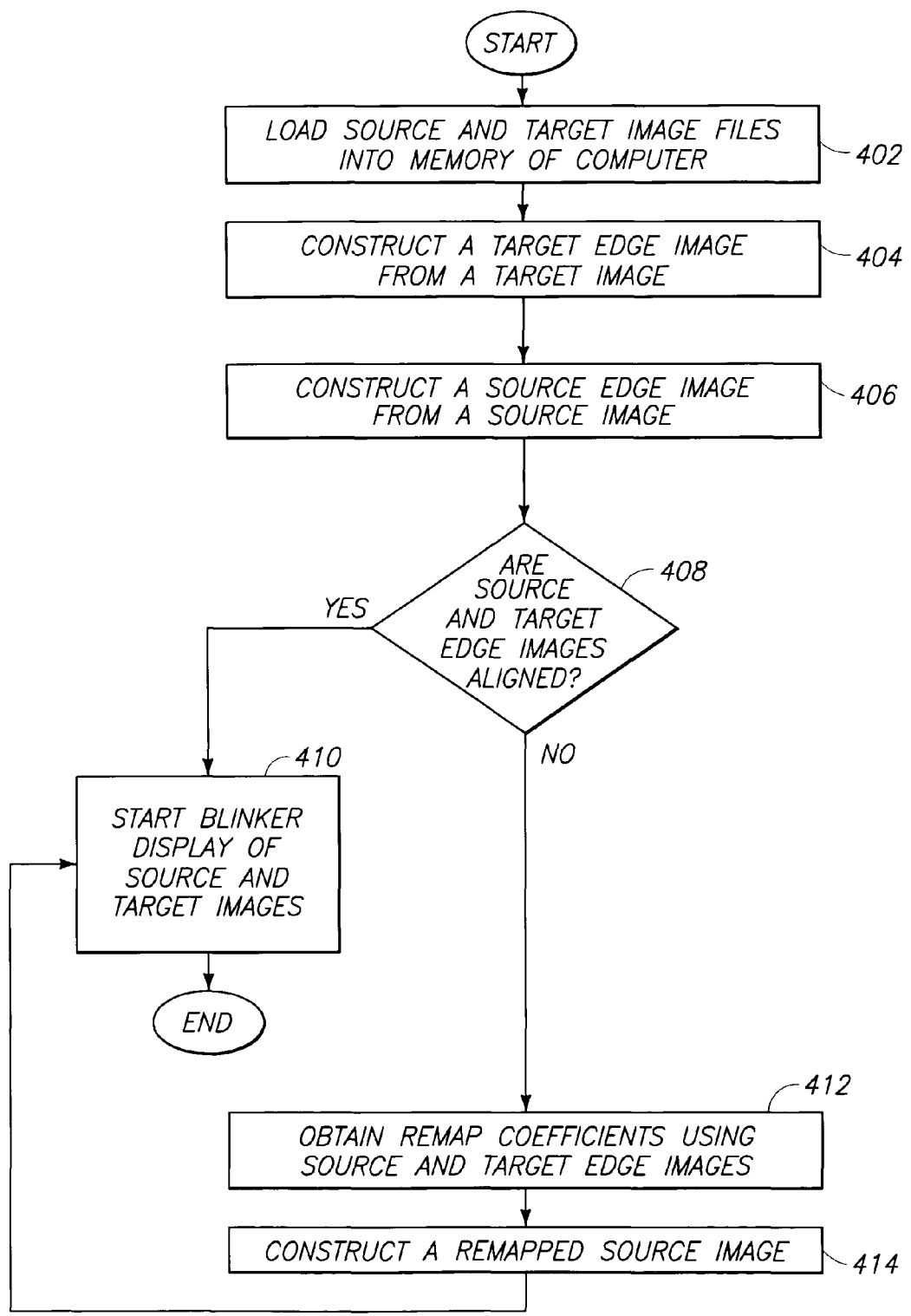
FIG. 4 is a high-level flow chart illustrating a methodology to determine differences between a source image and a target image in accordance with some embodiments of the present invention.

FIG. 4 is a high-level flow chart illustrating a methodology to determine differences between a source image and a target image in order to determine differences therein in accordance with some embodiments.

At a step 402, the source and target image files are loaded into memory 208 of computer 104 (FIG. 2). Source and target images 302, 304 are retrieved from the source and target image files and displayed on a display device 212 (FIG. 3) of the computer 104.

At a step 404, a target edge image is constructed from the target image 304.

At a step 406, a source edge image is constructed from the source image 302. Details of constructing the source and target edge images from the source and target images is set forth with regard to FIGS. 5, 5A, and 5B as below.

At a step 408, an inquiry is made to determine if the source and target edge images are aligned with respect to one another. Step 408 may be performed either automatically by processing circuitry 204 of the computer 104, or manually by a user of the computer 104. Further details regarding automatic alignment of the source and target edge images is set forth with regard to FIGS. 6, 7A, 7B and 7C as below. Step 410 is performed if the source and target edge images are aligned.

At a step 410, the blinker display (e.g., flip-flop display or periodic switching) of the source and target images is executed, either automatically by the processing circuitry 204 of computer 104, or manually by a user of the computer 104, in order to determine differences between the source and target images.

If the source and target edge images are not aligned, step 412 is performed. At a step 412, remap coefficients are obtained using the source and target edge images. The process then proceeds to step 414.

At a step 414, a remapped source image is constructed. Then, the process proceeds to step 410 to start the blinker display of source and target images.

A user may control execution of any of the steps 402-414 performed by processing circuitry 204 (FIG. 2). The user may initiate or terminate execution of any of the above noted steps. For example, during an automatic alignment procedure of the source and target edge images, the user may end image alignment steps and initiate the blinker display of the source and target images.

Figure 5:
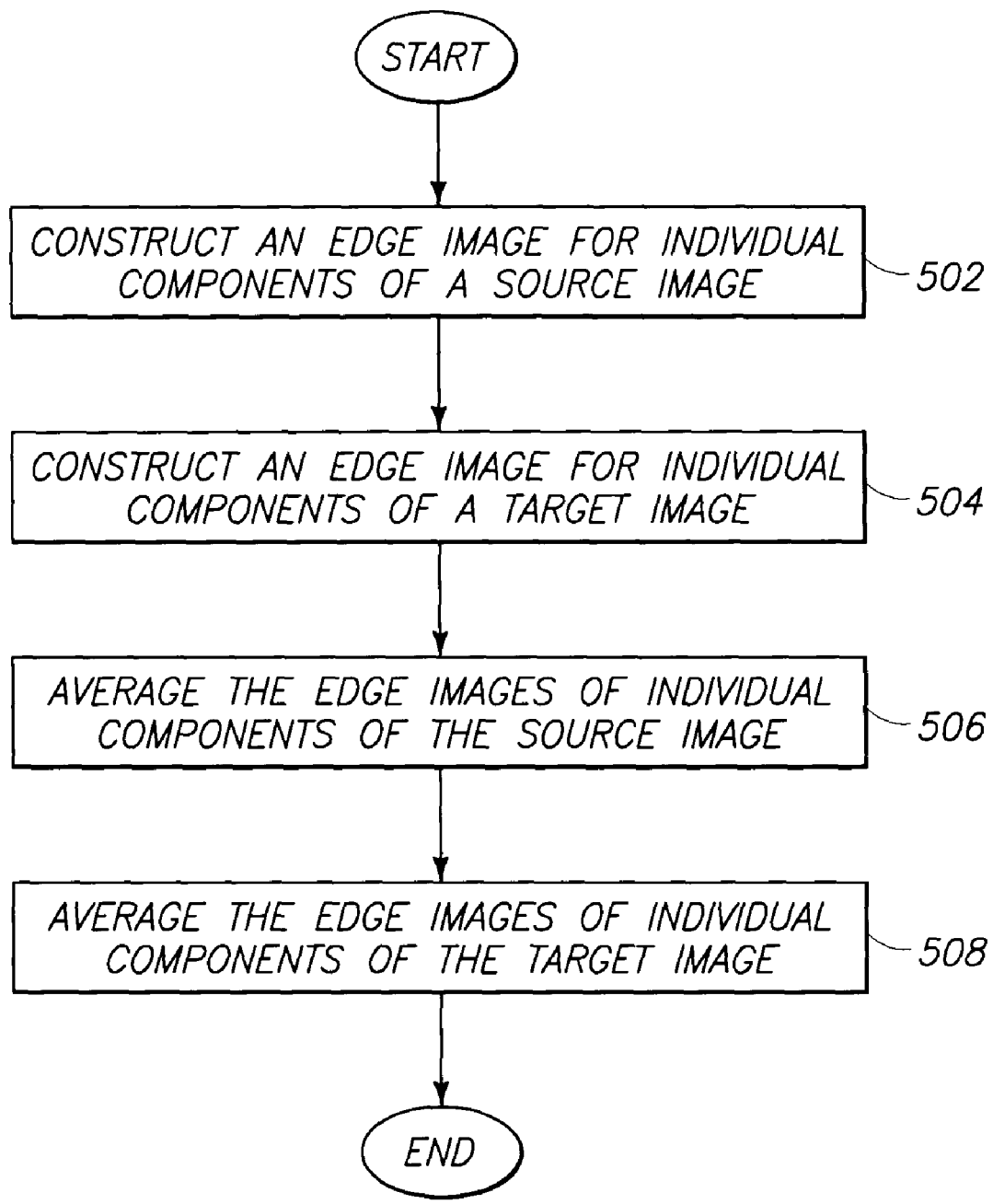
FIG. 5 is a high-level flow chart illustrating a methodology to determine source and target edge images from source and target images in accordance with an exemplary embodiment of the present invention.

FIG. 5 is a high-level flow chart to determine source and target edge images from source and target images in accordance with an exemplary embodiment of the present invention.

At a step 502, an edge image is constructed for individual color components (e.g., red, green, blue) of a source image (e.g., source image 302). Further details regarding computing a source edge image from a source image are set forth with regard to FIG. 5A.

At a step 504, an edge image is constructed for individual color components (e.g., red, green, blue) of a target image (e.g., target image 304). Further details regarding computing a target edge image from a target image are set forth with regard to FIG. 5B.

At a step 506, the edge images for individual color components of the source image are averaged to create a single source edge image corresponding to the source image.

At a step 508, the edge images for individual color components of the target image are averaged to create a single target image corresponding to the target image.

FIG. 5A is an exemplary flowchart for constructing a source edge image from a source image (e.g., source image 302). An initial source edge image is stored in a memory and corresponds to the source image 302. The source image 302 obtained from a source image file may also be referred to herein as a raw source image 302.

At a step 510, for each interior pixel of the source edge image, the corresponding pixel of the source image and four neighboring pixels of the corresponding pixel of the source image are examined.

At a step 512, largest and smallest intensity values of the corresponding pixel and the four neighboring pixels of the corresponding pixel are determined.

At a step 514, the difference between the largest and the smallest intensity values of the corresponding pixel and the four neighboring pixels is determined and established as an intensity value of the interior pixel in the source edge image.

At a step 516, a value of "0" is assigned to pixels at edges of the source edge image.

FIG. 5B is an exemplary flowchart for constructing a target edge image from a target image (e.g., target image 304). An initial target edge image is stored in a memory and corresponds to target image 304. The target image 304 obtained from a target image file may also be referred to herein as a raw target image 304. Steps 520-526 are performed as discussed above with regard to the source edge image and FIG. 5A.

FIG. 6 is a flowchart illustrating details of performing automatic alignment of the source and target edge images in accordance with some embodiments of the invention. More specifically, FIG. 6 illustrates a methodology to determine the values of remap coefficients to provide enhanced alignment of the remapped source and target images.

In step 602, various function arguments to perform alignment of the source and target edge images are retrieved from a calling program.

In step 604, a figure of merit (FoM) value is calculated for the source and target edge images. The process then proceeds to step 606.

In step 606, separation and ratio values are calculated for the source and target edge images. The process then proceeds to step 608.

In step 608, small image versions of the source and target edge images are constructed. The process then proceeds to step 609.

In step 609, remap coefficients for the small source and target edge images are computed. The process then proceeds to step 610.

In step 610, the small image version of the source image is remapped using the remap coefficient values. The process then proceeds to step 612.

In steps 612-614, intensity peaks in small image versions of target edge image and source edge image, respectively, are determined.

In step 616, intensity peaks in the source and target edge images are matched.

In step 618, an inquiry is made to determine if there are any errors present in the comparison step 616. If no errors are present, the process proceeds to step 620 and stops. If errors are present in the comparison step 616, the process then proceeds to step 622.

In step 622, non-linear squares fit of the source and target edge images is performed if errors are observed in the comparison step 616.

In step 624, new remap coefficients are calculated for the source and target edge images in order to rectify errors observed in step 616. The process then proceeds to step 625.

In step 625, new figure of merit values are computed (e.g., recompute figure of merit values). The process then proceeds to step 626.

In step 626, the new figure of merit values are compared with previously computed (e.g., old) figure of merit values. If the new figure of merit values are greater than the previously computed figure of merit values, the process proceeds to step 627. If the new figure of merit values are less than the previously computed figure of merit values, the process proceeds to step 620 and stops.

In step 627, the separation valve is compared with a predetermined threshold. The process proceeds to step 620 and stops if the separation value is less than a predetermined threshold.

FIG. 7 is a detailed flowchart, which is further broken down to FIGS. 7A-7C, illustrating further details of exemplary process steps shown in FIG. 6 in accordance with some embodiments of the present invention in order to perform automatic alignment of the source and target edge images.

In step 702, function arguments are retrieved from a calling program and provided to the processing circuitry 204 (FIG. 2) in order to perform automatic registration of the source and target edge images.

In step 704, flags (e.g., FASTFLAG) are either set or cleared as directed by function arguments. For example, FASTFLAG is a logical variable that is either set or cleared.

In step 706, a SEPARATION (SEP) value is set as an initial SEPARATION value as directed by the function arguments. The initial SEPARATION value is the largest expected distance between the position of any intensity peak in a target image and the corresponding peak in a source image.

In step 708, a figure of merit (FoM) value is calculated for the source and target edge images. The FoM is like a normalized covariance e.g., the covariance is divided by a square root of a product of individual variances), except that in the FoM, the mean value is not subtracted from the individual values in the calculations of the covariance or the individual variances.

Step 710 indicates the top of the iteration loop to perform some iterations in the methodology of FIG. 7.

In step 712, a value of the SEP is calculated. SEP is the value of smoothing width to be used during iterations to perform smoothing of the source and target edge images. A greater smoothing width provides increased smoothing and fewer local peaks after the smoothing of the source and target edge images. Using less smoothing in successive iterations reduces or eliminates the ambiguity in associating a target peak with a source peak. The following exemplary equation may be used to calculate the value of SEP:

If FASTFLAG is set, $$SEP=2.0+(SEPARATION-2.0)*(2.43-FoM*2.86).$$

If FASTFLAG is clear, $$SEP=SEPARATION.$$

Limit SEP to be not more than SEPARATION.
Limit SEP to be not less than 2.

In step 714, RATIO is calculated. RATIO is the size of the small images (in linear dimension) divided by the size of the source and target images. The smaller images, when possible, may be used instead of the full-size images in order to increase computational speeds which are generally slower with larger images. The following equation may be used to calculate the value of RATIO:

$$RATIO=3.0/(SEP-1.99).$$

Limit RATIO to be not less than 0.1.
Limit RATIO to be not more than 1.0.
Limit RATIO so that the small image size is at least 50 columns and 50 rows of pixels.

In step 716, smoothed copies of full-size source and target edge images are made using smoothing width with SEP computed in step 712.

In step 718, undersampling of the smoothed full-size images is performed. Undersampling is performed using an undersampling factor RATIO in order to compute smaller versions of the source and target images.

In step 720, the small image copy of the source edge image is remapped using the small image equivalent of the most recent remap coefficient values.

In step 722, intensity peaks in the small image copy of the target image are determined. This determination includes finding the apexes, the pixels corresponding to a local intensity maxima, and the side slopes of the intensity peaks in the target image.

In step 724, intensity peaks in the small image copy of the source image are determined. In this step, determination of only the apexes, the local intensity maxima, is required.

In step 726, a small weight image (WT) is constructed. The following equation may be used in constructing the small weight image:

If FLAGWEIGHT (a function argument) is 1, set all pixels in WT equal to
1, thereby giving all SOURCE and TARGET peaks equal weight.
Or, if FLAGWEIGHT is −1, set image WT equal to the remapped small
SOURCE, thereby giving each peak a weight equal to the height of that peak.
Or, if FLAGWEIGHT is neither 1 nor −1, construct WT by undersampling,
without smoothing first, the full-size image WEIGHT (a function argument).

In step 728, the intensity peaks in the remapped small source edge image are matched with those that of the small target edge image. However, the intensity peaks may not be matched if the separation between the intensity peaks of the source and target edge images is greater than 2*(SEP)*(RATIO), i.e., twice the product of SEP and RATIO values.

In step 730, new or revised remap coefficients are calculated using a non-linear squares fit calculation in order to calculate corrections to the adjustable parameters, which in this case are the remap coefficients. In this calculation step, each matched peak pair (one peak in the remapped small source edge image and its matching peak in the small target edge image) represents one data point. The error that is desired to be minimized is the distance between the peak position in the remapped small source edge image and the peak position in the small target edge image. While performing the above calculation step 730, the number of data points are counted and identified as NPEAKS.

In step 732, an inquiry is made to determine if the NPEAKS is more than 5. The process proceeds to step 734 if the NPEAKS is more than 5. The process proceeds to step 740 if the NPEAKS is not more than 5.

In step 734, the new remap coefficients are used to calculate a new or revised figure of merit (FoM).

In step 736, an inquiry is made to determine if the new FoM is greater than the old or previously calculated FoM. The process proceeds to step 738 if the new FoM is greater than old FoM. The process proceeds to step 740 if the new FoM is not greater than the old FoM.

In step 738, old remap coefficients are replaced with new or revised remap coefficients, and the old FoM value is replaced with the new or revised FoM value. Also, SEPARATION is set to be equal to SEP.

In step 740, old values of the remap coefficients, FoM, and SEPARATION are retained.

In step 742, an inquiry is made to determine if SEPARATION is less than 2.0. The process proceeds to step 744 if the SEPARATION is not less than 2.0. Otherwise, the process proceeds to step 750.

In step 744, an inquiry is made to determine if the SEPARATION is more than 0.993. The process proceeds to step 746 if the SEPARATION is not more than 0.993. Otherwise, the process proceeds to step 750.

In step 746, the SEPARATION is multiplied by a factor of 0.5.

Step 748 indicates an end of the iteration loop and the process proceeds to step 710.

In step 750, the remap coefficient function argument is set to be equal to old values of the remap coefficients.

Aspects of the invention enable detection of small differences between two similarly appearing objects (e.g., source and target images) or scenes. Further, aspects of the invention enable a user to control registration and the blinker display of the source and target images. Furthermore, a user is enabled to easily notice small changes or differences, which would otherwise go unnoticed, between the source and target images. The ability to notice small changes between a plurality of similarly appearing images may be useful to (a) perform quality control, (b) detect wear and damage to hardware, (c) detect tampering, (d) detect personnel intrusion into off-limit areas, (e) monitor physiological changes, such as for example, tumor growth and fracture healing, etc.

The protection sought is not to be limited to the disclosed embodiments, which are given by way of example only, but instead is to be limited only by the scope of the appended claims.

What is claimed is:

1. A method of identifying differences between a pair of images, comprising:
    loading a source image and a target image into memory of a computer;
    constructing source and target edge images from the source and target images to enable processing of multiband images;
    displaying the source and target images on a display device of the computer;
    automatically aligning the source and target edge images by:
        a) computing figure of merit values for the source and target edge images;
        b) computing separation and ratio values for the source and target edge images;
        c) constructing small image versions of the source and target edge images;
        d) computing remap coefficients for the small image versions of the source and target edge images;
        e) remapping the small image versions using the remap coefficients;
        f) determining intensity peaks in the small image versions of the source and target edge images; and
        g) matching intensity peaks in the source and target edge images; and
    switching displaying of the source image and the target image on the display device to enable identification of differences between the source image and the target image.

2. The method of claim 1, wherein the aligning is automatically performed by the computer.

3. The method of claim 1, further comprising:
    h) performing non-linear squares fitting;
    i) computing new remap coefficients of the source and target edge images;
    j) computing new figure of merit values using the new remap coefficients;
    k) comparing the new figure of merit values with the figure of merit values computed in step a); and
    l) iterating acts b)-k) until either the separation or figure of merit values are within predetermined limits.

4. The method of claim 1, wherein the separation comprises smoothing width for the source and target edge images, and further wherein the smoothing width is inversely proportional to a degree of smoothing and local peaks present in the source and target edge images.

5. The method of claim 1, wherein the aligning comprises manually aligning the source and target images.

6. The method of claim 5, wherein the manually aligning the source and target edge images comprises:
    enabling a user selecting a tie-point in the target image and a tie-point in the source image to perform alignment of the source and target images; and
    computing remap coefficients using the selected tie-points in the source and target images.

7. The method of claim 1, wherein the constructing the source and target edge images comprises:
    constructing an edge image for individual color components of the source image;
    constructing an edge image for individual color components of the target image;
    averaging the edge images of individual color components of the source image to create a single source edge image corresponding to the source image; and
    averaging the edge images of individual color components of the target image to create a single target edge image corresponding to the target image.

8. The method of claim 7, wherein the constructing the source edge image comprises:
    for each interior pixel of the source edge image:
        examining a corresponding pixel of the source image and four neighboring pixels of the corresponding pixel of the source image;
        determining largest and smallest intensity values of the corresponding pixel and the four neighboring pixels; and
        establishing a difference between the largest and the smallest intensity values of the corresponding pixel and the four neighboring pixels as an intensity value of the interior pixel in the source edge image; and
    assigning a value of 0 to pixels at a periphery of the source edge image.

9. The method of claim 7, wherein the constructing the target edge image comprises:
    for each interior pixel of the target edge image:
        examining a corresponding pixel of the target image and four neighboring pixels of the corresponding pixel of the target image;
        determining largest and smallest intensity values of the corresponding pixel and the four neighboring pixels;
        establishing a difference between the largest and the smallest intensity values of the corresponding pixel and the four neighboring pixels as an intensity value of the interior pixel in the target edge image; and
    assigning a value of 0 to pixels at a periphery of the target edge image.

10. The method of claim 1, wherein the source and target images each comprise color images having a plurality of color bands.

11. The method of claim 1, wherein performing alignment using the target and source edge images enables alignment of source and target images that are not of similar types.

12. The method of claim 1, wherein performing alignment using the target and source edge images enables merging of information from several bands of a multi-band image into a single-band image to obtain efficient processing of images.

13. A method of identifying differences between a pair of images, comprising:
    receiving source and target images in a computer;
    constructing source and target edge images from the respective source and target images to enable processing of multiband images;
    performing alignment of the source and target edge images displayed on a display device of the computer by:

computing figure of merit values for the source and target edge images;

computing separation and ratio values for the source and target edge images;

constructing small image versions of the source and target edge images;

computing remap coefficients for the small image versions of the source and target edge images;

remapping the small image versions using the remap coefficients;

determining intensity peaks in the small image versions of the source and target edge images; and matching intensity peaks in the source and target edge images; and periodically switching displaying of the source and target images on the display device.

14. The method of claim 13, wherein the periodically switching further comprises:

obtaining remap coefficients using the source and target edge images; and computing a remapped source edge image using the remap coefficients to correct alignment errors between the source and target edge images.

15. The method of claim 13, wherein the performing the alignment is automatically performed by the computer.

16. The method of claim 15, wherein the performing the alignment by the computer further comprises:

selecting control points in the source and target edge images by a user; and providing the selected control points to the computer for alignment of the source and target edge images by the computer.

17. The method of claim 15, wherein the performing the alignment by the computer further comprises:

selecting a region of interest in the source and target images by a user; and providing the selected region of interest to the computer for alignment of the source and target edge images by the computer.

18. The method of claim 13, wherein the performing the alignment is manually performed by a user.

19. The method of claim 18, wherein performing the alignment manually comprises:

selecting control points in the source and target images; and aligning the source and target images using the selected control points.

20. The method of claim 18, wherein performing the alignment manually comprises:

selecting a region of interest in the source and target images; and aligning the source and target images using the selected region of interest.

21. The method of claim 13, wherein the periodically switching the displaying of the source and target images is performed automatically performed by the computer.

22. The method of claim 13, wherein the periodically switching the displaying of the source and target images is performed by a user.

23. The method of claim 13, wherein the performing the alignment of the source and target edge images further comprises:

using a least squares computation to match the intensity peaks in the source and target edge images.

24. The method of claim 13, wherein the constructing the source edge image comprises:

for each interior pixel of the source edge image:

examining a corresponding pixel of the source image and four neighboring pixels of the corresponding pixel of the source image;

determining largest and smallest intensity values of the corresponding pixel and the four neighboring pixels; and establishing a difference between the largest and the smallest intensity values of the corresponding pixel and the four neighboring pixels as an intensity value of the interior pixel in the source edge image; and assigning a value of 0 to pixels at a periphery of the source edge image.

25. The method of claim 13, wherein the constructing the target edge image comprises:

for each interior pixel of the target edge image:

examining a corresponding pixel of the target image and four neighboring pixels of the corresponding pixel of the target image;

determining largest and smallest intensity values of the corresponding pixel and the four neighboring pixels; and establishing a difference between the largest and the smallest intensity values of the corresponding pixel and the four neighboring pixels as an intensity value of the interior pixel in the target edge image; and assigning a value of 0 to pixels at a periphery of the target edge image.

26. An image change detection system, comprising:

a storage device configured to receive and store a pair of images, as a pair of image files including a source image and a target image; and processing circuitry configured to:

receive the source and target images;

compute source and target edge images from the respective source and target images to enable processing of multiband images;

execute alignment of the source and target edge images by;

computing figure of merit values for the source and target edge images;

computing separation and ratio values for the source and target edge images;

constructing small image versions of the source and target edge images;

computing remap coefficients for the small image versions of the source and target edge images;

remapping the small image versions using the remap coefficients;

determining intensity peaks in the small image versions of the source and target edge images; and matching intensity peaks in the source and target edge images; and execute periodic switching of the source and target images to enable a user to determine changes between the source and target images.

27. The image change detection system of claim 26, wherein the source and target images are automatically aligned by the processing circuitry.

28. The image change detection system of claim 26, wherein the source and target images are manually aligned by a user of the image change detection system.

29. An article of manufacture comprising:

processor-usable media embodying programming configured to cause a processing circuitry of an image change detection system to:

load a source image and a target image into memory of a computer;

construct source and target edge images from the source and target images to enable processing of multiband images;

display the source and target images on a display device of the computer;

align the source and target edge images by causing the processing circuitry to:
  a) compute figure of merit values for the source and target edge images;
  b) compute separation and ratio values for the source and target edge images;
  c) construct small image versions of the source and target edge images;
  d) compute remap coefficients for the small image versions of the source and target edge images;
  e) remap the small image versions using the remap coefficients;
  f) determine intensity peaks in the small image versions of the source and target edge images; and
  g) match intensity peaks in the source and target edge images; and switch displaying of the source image and the target image on the display device, to enable identification of differences between the source image and the target image.

30. The article of manufacture of claim 29, further comprising causing the processing circuitry to:
  h) perform non-linear squares fitting;
  i) compute new remap coefficients of the source and target edge images;
  j) compute new figure of merit values using the new remap coefficients;
  k) compare the new figure of merit values with the first computed figure of merit values; and
  l) iterate acts b)-k) until either the separation or figure of merit values are within predetermined limits.

31. An image change detection system, comprising:
means for loading a source image and a target image into a memory means of a computer means;
means for constructing source and target edge images from the source and target images to enable processing of multiband images;
means for displaying the source and target images on a display means of the computer means;
means for aligning the source and target edge images, comprising:
  means for computing figure of merit values for the source and target edge images;
  means for computing separation and ratio values for the source and target edge images;
  means for constructing small image versions of the source and target edge images;
  means for computing remap coefficients for the small image versions of the source and target edge images;
  means for remapping the small image versions using the remap coefficients;
  means for determining intensity peaks in the small image versions of the source and target edge images; and
  means for matching intensity peaks in the source and target edge images; and
means for switching displaying of the source image and the target image on the display means, to enable identification of differences between the source image and the target image.

32. The image change detection system of claim 31, further comprising:
means for performing non-linear squares fitting; and
means for computing new remap coefficients of the source and target edge images.

* * * * *

UNITED STATES PATENT AND TRADEMARK OFFICE
CERTIFICATE OF CORRECTION

PATENT NO.       : 7,643,703 B2                                         Page 1 of 1
APPLICATION NO. : 10/655467
DATED            : January 5, 2010
INVENTOR(S)      : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1729 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,643,703 B2 | |
| APPLICATION NO. | : 10/655467 | |
| DATED | : January 5, 2010 | |
| INVENTOR(S) | : James L. Jones, Gordon D. Lassahn and Gregory D. Lancaster | |

It is certified that error appears in the above-identified patent and that said Letters Patent is hereby corrected as shown below:

In the specification:

COLUMN 4, LINE 27, change "alternating display" to --alternating a display--
COLUMN 4, LINE 60, change "keyboard," to --a keyboard,--

Signed and Sealed this
Twenty-third Day of July, 2013

Teresa Stanek Rea
*Acting Director of the United States Patent and Trademark Office*